T. F. BUCK.
SAFETY FENDER FOR AUTOMOBILES.
APPLICATION FILED MAY 17, 1921.

1,387,100.

Patented Aug. 9, 1921.
3 SHEETS—SHEET 1.

Witness:
J. Milton Jester

Inventor
Thomas F. Buck
By D. A. Gourick
Attorney

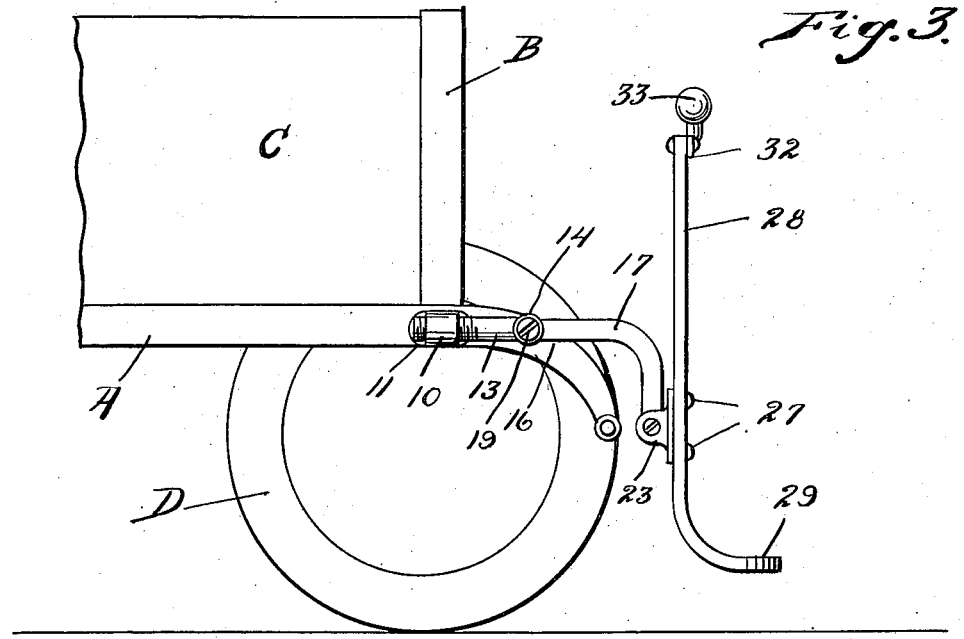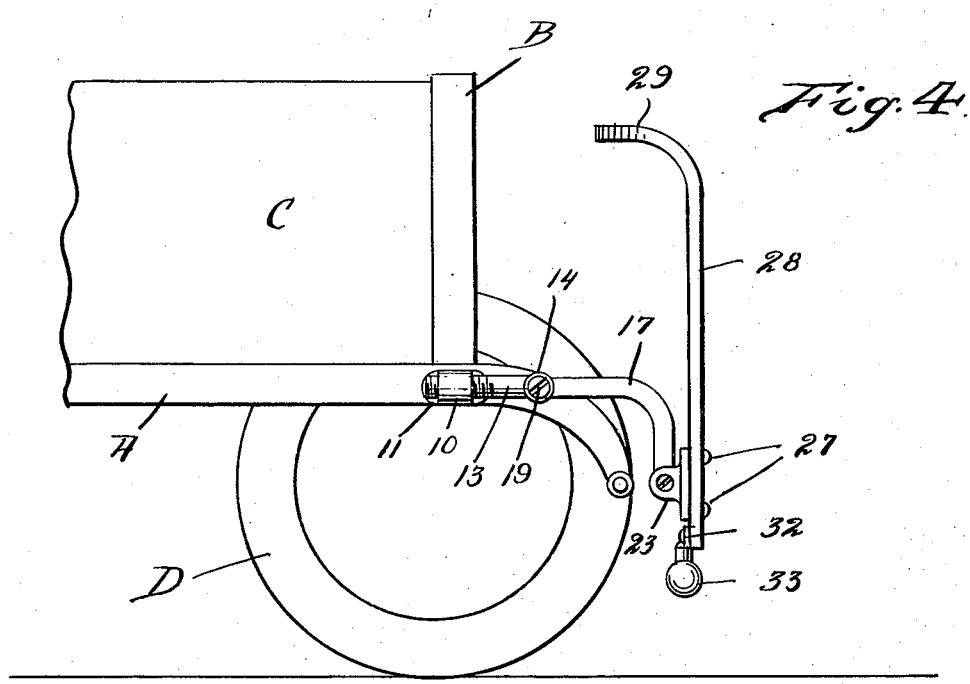

T. F. BUCK.
SAFETY FENDER FOR AUTOMOBILES.
APPLICATION FILED MAY 17, 1921.
1,387,100.
Patented Aug. 9, 1921.
3 SHEETS—SHEET 3.
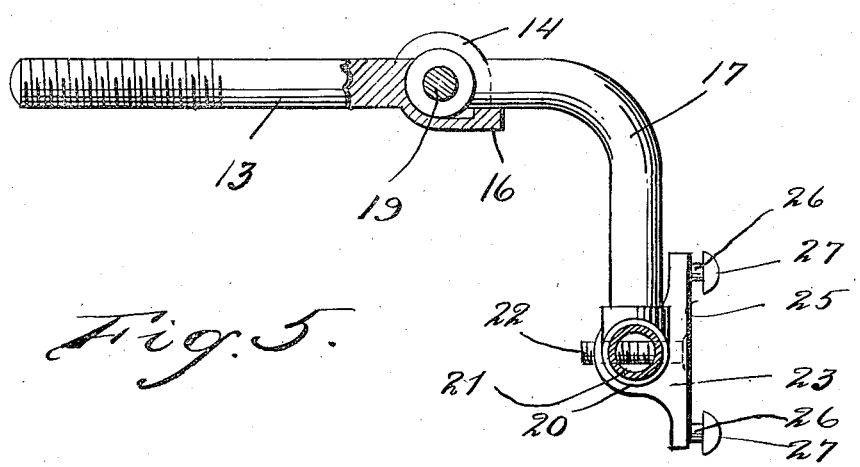
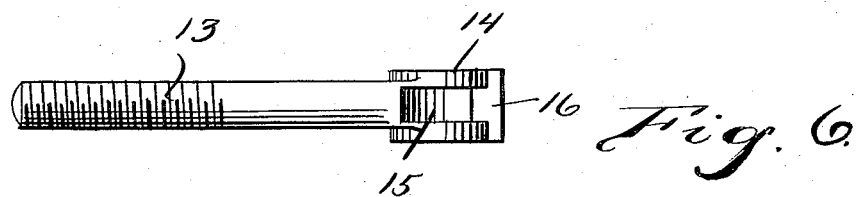
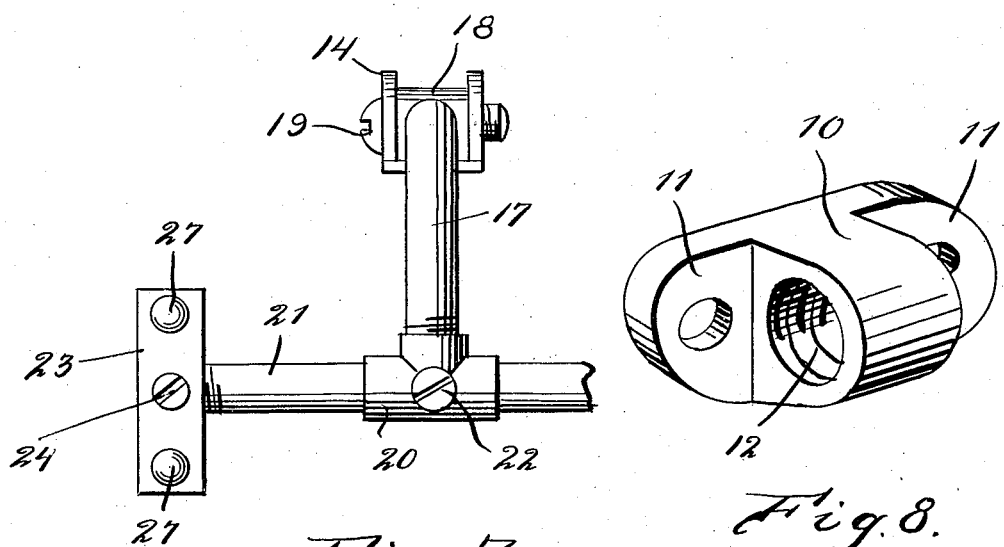
Inventor
Thomas F. Buck
Witness:
J. Milton Jester
By J. A. Gourick
Attorney

UNITED STATES PATENT OFFICE.

THOMAS F. BUCK, OF NEW CASTLE, PENNSYLVANIA.

SAFETY FENDER FOR AUTOMOBILES.

1,387,100.

Specification of Letters Patent.

Patented Aug. 9, 1921.

Application filed May 17, 1921. Serial No. 470,375.

*To all whom it may concern:*

Be it known that I, THOMAS F. BUCK, a citizen of the United States, residing at New Castle, in the county of Lawrence and State of Pennsylvania, have invented new and useful Improvements in Safety Fenders for Automobiles, of which the following is a specification.

This invention relates to safety appliances, particularly to safety attachments for automobiles, and has for its object the provision of a novel bumper or fender adapted to be mounted upon the front of an automobile whereby to prevent running over pedestrians, the device being also useful in protecting the car against injury in the event of a minor collision.

An important object is the provision of a device of this character in which the bumper or fender proper may be removed and reversed in case the roads are sufficiently rough and full of obstructions that there might be danger of striking and breaking the device, the construction being such that the position of the fender proper may be very quickly and easily changed without the employment of any tools.

Another object is the provision of a device of this character which is so constructed that a person might stand thereupon or that an article of baggage or the like might be carried thereon if found advisable or in the event of some particular emergency.

An additional object is the provision of a device of this character which will be simple and inexpensive in manufacture, easy to install, highly efficient in use, durable in service, and a general improvement in the art.

With the above and other objects and advantages in view, the invention consists in the details of construction to be hereinafter more fully described and claimed and illustrated in the accompanying drawings in which—

Fig. 3 is a side elevation.

Fig. 4 is a side elevation showing the fender proper in inverted position.

Fig. 5 is a detail side elevation of one bracket arm detached, parts being broken away and in section.

Fig. 6 is a plan view of one bracket arm detached.

Fig. 7 is a front elevation of the device detached and with the fender proper removed.

Fig. 8 is a detail perspective view of the securing bracket secured on each frame bar.

Figure 1:
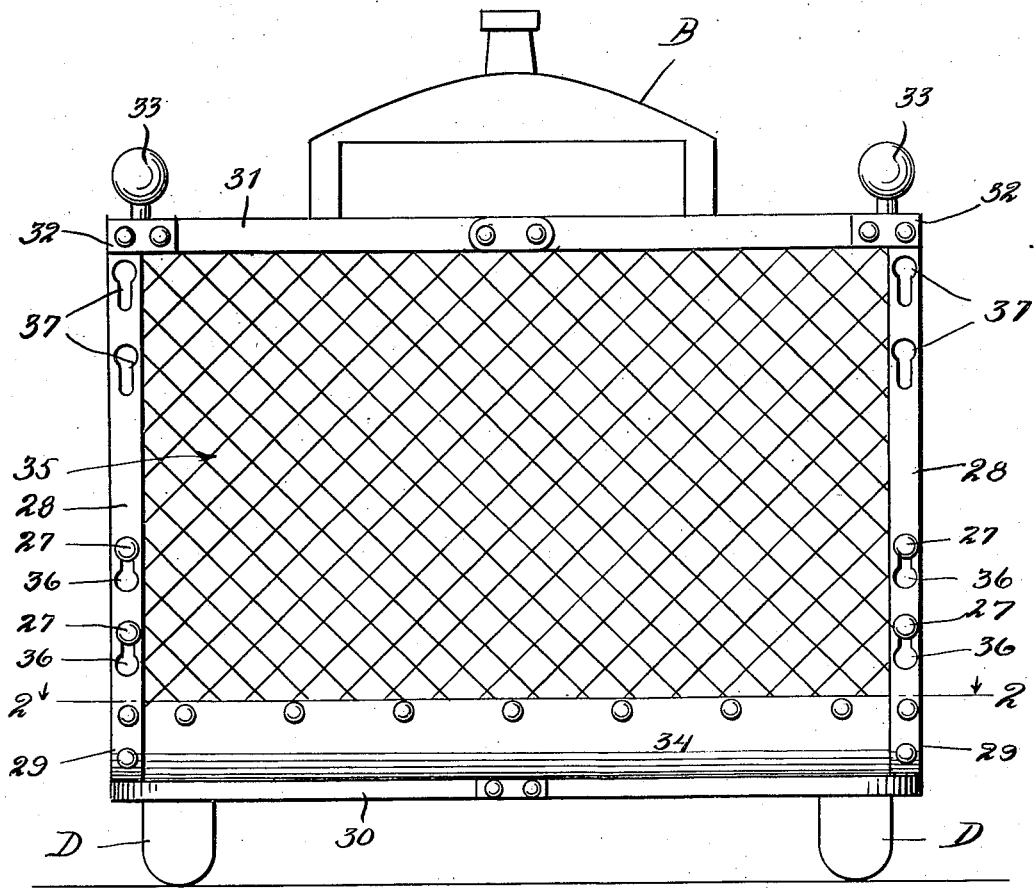
Figure 1 is a front elevation of my device applied.
Figure 2:
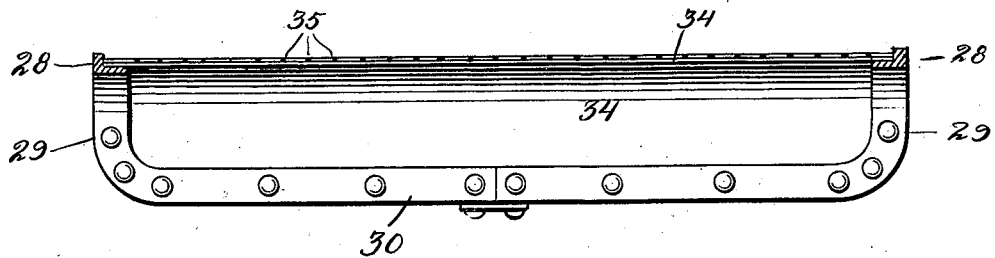
Fig. 2 is a horizontal sectional view therethrough on the line 2—2 of Fig. 1.

Referring more particularly to the drawings, the letter A designates the forward end of the side bars of an automobile frame, B designates the radiator, C the hood, and D the front wheels. In carrying out my invention I secure upon the outer side of each frame bar A a bracket 10 formed with ears 11 through which pass suitable bolts. The body portion of this bracket is formed with a threaded hole 12 and screwed into the hole 12 of each bracket is a bolt-like member 13 having its head 14 formed with a bifurcation 15 and provided with a forward extension 16.

Associated with each member 13 is a curved arm 17 which may be formed solid or tubular and the rear end of this arm is formed with a head 18 disposed within the bifurcation 15 of a bolt member 13 and secured therein by means of a transversely disposed bolt 19. The lower or forward end of each arm 17 is threaded, as shown, and screwed thereonto, is a T 20. Extending through both T's 20 is a horizontal bar 21 held against displacement by means of screws 22 threaded through the T's and engaging the bar. The outer ends of this bar 20 are threaded and screwed thereonto are brackets 23 held against displacement by screws 24 passing therethrough and through the extremities of the bar 21. The bracket members 23 are formed with straight or plane forward faces 25 from which project studs 26 having enlarged heads 27.

The fender proper comprises a rectangular frame including upright side bars 28 which have their lower ends curved forwardly, as shown at 29, these curved lower ends being connected by a horizontal cross bar 30. The upper ends of the uprights 28 are connected by a cross bar 31. It will be observed that the bars 30 and 31 are each formed in two sections, though this is not necessary as they might be formed of only one section or more than two if preferred. Secured at the outer ends of the upper bar 31 are corner plates 32 which preferably carry knobs 33 which are principally for ornamental purposes. Extending across the lower portion of this fender frame and secured to the lower curved ends 29 of the uprights is a sheet-metal plate 34. The opening in this fender frame is covered by wire netting 35, though it is of course to be understood that an expanded metal sheet might be used if preferred.

In order that this fender proper may be held upon the frame structure previously described, I form the side bars 28 each with a pair of key-hole slots 36 engageable upon the headed studs 26. When these key-hole slots are engaged upon the studs it will be apparent that the fender proper will be supported in vertical position and will have the appearance shown in Figs. 1 and 3. In order that the fender proper may be inverted and thus held out of the way in case the automobile is being driven over rough or stony roads, I provide the frame bars 28 with other pairs of key-hole slots 37 which are arranged opposite to the slots 36 and which may be engaged upon the headed studs so as to hold the fender proper in reversed position, as shown in Fig. 4.

From the foregoing description and a study of the drawings it will be apparent that I have thus provided a simply constructed and consequently inexpensive safety fender or bumper which may be easily installed upon an automobile and which will be an effective safe-guard for pedestrians inasmuch as it will prevent the automobile from running over a person, especially in view of the fact that the fender proper extends beyond the wheels and comparatively close to the ground.

While I have shown and described the preferred embodiment of my invention, it is of course to be understood that I reserve the right to make such changes in the form, construction and arrangement of parts as will not depart from the spirit of the invention or the scope of the subjoined claims.

Having thus described my invention, what I claim as new and desire to secure by Letters Patent is:

1. A safety fender attachment for automobiles comprising a pair of forwardly extending arms secured to the frame bars of an automobile, and a fender proper detachably connected with the forward extremities of said arms, the fender proper being capable of being mounted in inverted position to space it farther from the ground for avoiding obstructions.

2. A safety fender attachment for automobiles comprising a pair of forwardly extending arms secured to the frame bars of an automobile, and a fender proper detachably connected with the forward extremities of said arms, said fender proper normally approaching the ground comparatively closely and being capable of being connected with the arms in inverted position whereby to be farther removed from the ground.

3. A safety fender attachment for automobiles comprising a pair of arms secured to and extending forwardly beyond the frame bars of an automobile, a transverse bar connecting said arms, bracket members carried by the ends of said bar and carrying headed studs, and a fender proper formed as a screen-covered frame having its side bars formed with key-hole slots removably engaged upon said headed studs, the fender proper being of L shape with the lower portion extending forwardly and serving as a platform.

4. A safety fender attachment for automobiles comprising a pair of arms secured to and extending forwardly beyond the frame bars of an automobile, a transverse bar connecting said arms, bracket members carried by the ends of said bar and carrying headed studs, and a fender proper formed as a screen-covered frame having its side bars formed with key-hole slots removably engaged upon said headed studs, said side bars being additionally formed with a second set of key-hole slots extending oppositely to the first named set whereby the fender proper may be secured in inverted position.

5. A safety fender attachment for automobiles comprising a pair of brackets secured upon the forward ends of the frame bars of the automobile and formed with threaded bores, a pair of bolt members screwed into said bores and having heads formed with bifurcations and provided with forward extensions, a pair of forwardly and downwardly curved arms having their rear ends provided with heads secured within said bifurcations with the rear portions of the arms engaging upon said extensions, T's carried by the lower forward ends of the arms, a cross bar secured through said T's, brackets mounted on the extremities of said cross bar, and a fender proper formed as a screen-covered frame detachably connected with said last named brackets.

In testimony whereof I hereto affix my signature.

THOMAS F. BUCK.